July 28, 1959 — D. W. KELBEL — 2,896,479
TRANSMISSION
Filed May 6, 1952 — 2 Sheets-Sheet 1

Inventor:
Donald W. Kelbel
By Keith J. Blewe
Atty.

July 28, 1959

D. W. KELBEL 2,896,479

TRANSMISSION

Filed May 6, 1952

Inventor:
Donald W. Kelbel
By Keith J. Blew
Atty.

United States Patent Office 2,896,479
Patented July 28, 1959

2,896,479

TRANSMISSION

Donald W. Kelbel, Muncie, Ind., assignor to Borg-Warner Corporation, Chicago, Ill., a corporation of Illinois Application May 6, 1952, Serial No. 286,331

1 Claim. (Cl. 74—781)

My invention relates to transmissions for automotive vehicles and also to lubricating systems for such transmissions, including pumps for causing a flow of lubricating fluid through the transmissions.

It is an object of the invention to provide an improved overdrive transmission of the planetary gearing type for driving the road wheels of a vehicle through a direct drive power train and an overdrive power train, with a two position positive clutch being provided for completing both the direct and the overdrive power trains. Preferably the clutch includes blocker synchronizing means which blocks engagement of the clutch into its two engaged positions prior to a synchronism in speed of the engageable parts of the clutch and for frictionally synchronizing the speeds of the engaging parts during such blocking action.

It is another object in connection with such a planetary type transmission to provide an improved lubricating system for the transmission by means of which lubricating fluid, such as oil is transmitted from a source of lubricating fluid under pressure to the bearings of the planet gears in the transmission.

It is another object of the invention to provide an improved lubricating fluid pump which may be located externally of the transmission at any suitable position of the vehicle and which is driven from a source of power other than any in the transmission, such as by the vacuum existing in the fuel intake manifold of the vehicle engine.

More particularly it is an object to provide an improved pump of this type having a diaphragm subjected alternately to atmospheric pressure and to the engine vacuum for reciprocating the diaphragm and a pump piston connected therewith so as to take in and discharge under pressure lubricating fluid from a sump in the transmission. It is another object to provide a valve for applying alternately atmospheric pressure and vacuum to the diaphragm, which is moved by a shaft connected with the diaphragm and reciprocable therewith, the shaft being preferably connected with the valve by means of an overcenter mechanism that moves the valve in one direction as the shaft reaches one limit of its movement and moves the valve in the other direction as the shaft reaches the other limit of its movement.

The invention consists of the novel constructions, arrangements and devices to be hereinafter described and claimed for carrying out the above stated objects and such other objects as will appear from a detailed description of a certain preferred embodiment illustrated with reference to the accompanying drawings, wherein:

Like characters of reference designate like parts in the several views.

Figure 1:
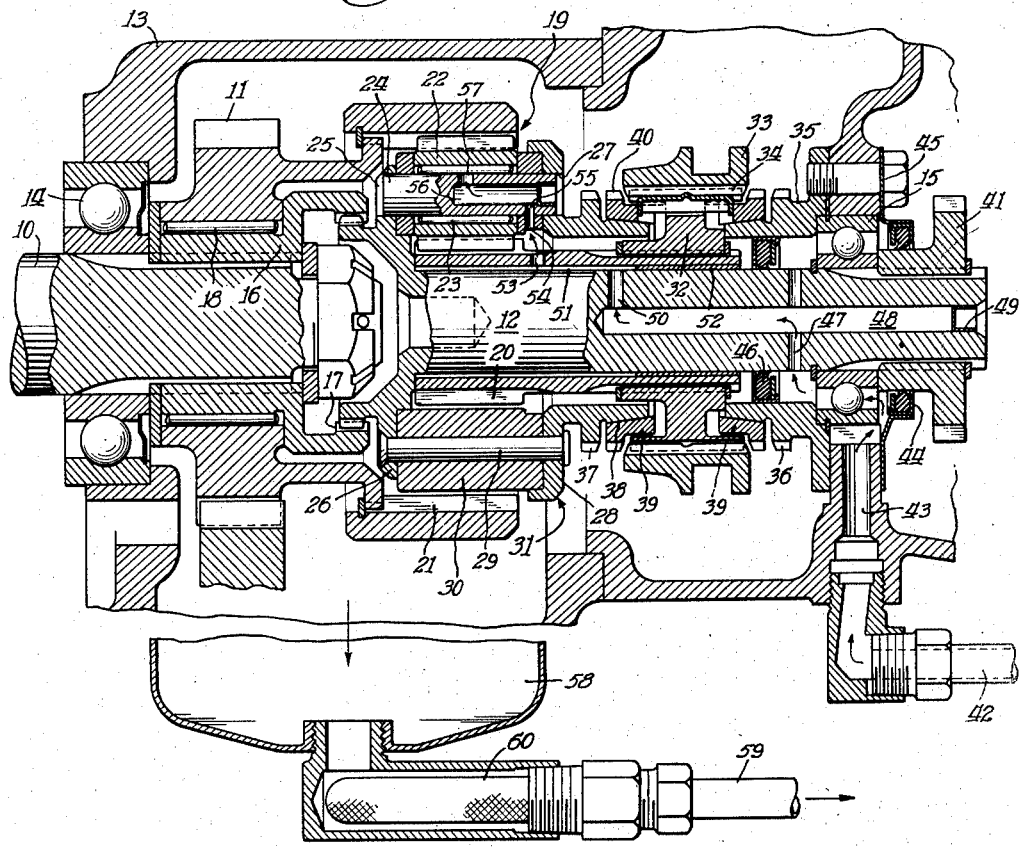
Fig. 1 is a longitudinal sectional view of a transmission embodying the principles of the invention.

Referring now to Fig. 1, the illustrated transmission comprises a drive shaft 10, a driven gear 11, constituting the output element of the transmission and an intermediate shaft 12. The drive shaft 10 is adapted to be driven through any suitable connections by the vehicle engine (not shown), and the output gear 11 is adapted to drive the propelling road wheels (not shown) of the vehicle through any suitable connections. The shafts 10 and 12 are rotatably disposed within a transmission case or housing 13 by means of ball bearings 14 and 15 respectively. A bridging sleeve 16 is splined on to the shaft 10 and is connected by means of teeth 17 with the shaft 12 for the purpose of driving the shaft 12 from the shaft 10. The output element 11 is rotatably disposed on the bridging sleeve 16 by means of bearing needles 18 located between the gear 11 and the sleeve 16.

Planetary gearing 19 is provided for driving the output element 11 at an overdrive speed ratio with respect to the drive shaft 10. The gearing comprises a sun gear 20, a ring gear 21 and a plurality of planet gears 22 in mesh with both the ring gear 21 and the sun gear 20. The sun gear 20 is rotatably mounted on the shaft 12, and the ring gear 21 is connected with the output gear 11. Each of the planet gears 22 is rotatably mounted by means of bearing needles 23 on a stub pinion shaft 24. The pinion shafts 24 on one end fit into openings 25 provided in a flange 26 formed on the shaft 12, and the pinion shafts 24 at the other end fit into openings 27 formed in an annular member 28 which is fixed by means of rivets 29 with respect to the flange 26. An annular member 30 is disposed between the flange 26 and the member 28, and the rivets 29 extend through the member 30. The annular member 30 is provided with spaced openings about its periphery receiving the gears 22. The annular members 28 and 30, together with the flange 26, all rotate together due to the fact that they are held together by the rivets 29, and these elements rotating together constitute a carrier 31 for the planet gears 22.

A two position positive type clutch and brake is provided for connecting the sung gear 20 with the transmission case 13 in one position of the clutch and brake and for connecting the sun gear 20 with the planet gear carrier 31 in another position of the clutch and brake. The clutch and brake comprise a hub 32 splined on to the sun gear 20 and a sleeve 33 slidably splined by means of internal teeth 34 on the hub 32. An annular member 35 having teeth 36 is fixed to the transmission case 13, and the sleeve 33 is adapted to mesh by means of its internal teeth 34 with the teeth 36 when it is moved to the right as seen in the drawing. The annular member 28 is provided with teeth 37, and the teeth 34 on the sleeve 33 are adapted to mesh with the teeth 37 when the sleeve 33 is moved to the left. The annular members 28 and 35 are provided with coned friction surfaces 38, and synchronizing rings 39 having blocking teeth 40 and coned friction surfaces conforming to the surfaces 38 are disposed on the surfaces 38. The blocker type synchronizing rings 39 are of well-known construction and hence will not be further described in detail.

Power may also be taken off the shaft 12 if desired, and for this purpose a gear 41 is fixed on to the end of the shaft 12.

A lubricating system for the transmission is provided which includes a conduit 42 connected with a passage 43 provided in the case 13. The passage 43 is connected to discharge oil into and through the ball bearing 15. A fluid seal 44 is provided, bearing on the external surface of the gear 41, being held in such position by means of an annular sheet metal retainer 45, for sealing the transmission case 13 with respect to the gear 41. A similar fluid seal 46 is provided within the annular member 35 and between the member 35 and the shaft 12. The seals 44 and 46 thus seal both sides of the bearing 15.

The shaft 12 is provided with radially extending passages 47 therein which are in communication with an axial passage 48 extending through the shaft 12. The passage 48 is closed by means of a cap 49 on one end and is in communication with a radially extending passage 50 in the shaft. The passage 50 communicates with a cylindrical space 51 between the sun gear 20 and the shaft 12 which is closed at one end by means of a bearing sleeve 52 supporting the sun gear 20 with respect to the shaft 12. The sun gear 20 is provided with a radially extending passage 53 in communication with the space 51 which is in substantial axial alignment with passages 54 and 55 provided in the member 30 and shafts 24 respectively. Each of the shafts 24 is provided with an axial passage 56 in communication with its passage 55, and each shaft 24 is also provided with a radially extending passage 57 in communication with the axial passage 56 and which is adapted to supply oil to the bearing needles 23. The transmission case 13 is provided with a lubricant sump 58 which is connected with an outlet conduit 59 through which oil collecting in the sump may be drawn. Any suitable fluid connections may be used between the sump 58 and the conduit 59, and preferably a screen filter 60 is provided between the sump and the conduit 59 for cleaning the oil that flows into the conduit 59.

The transmission may be conditioned for transmitting a one to one direct drive between the shaft 10 and the output gear 11 by moving the clutch sleeve 33 to the left to mesh its internal teeth 34 with the teeth 37 on the carrier 31. The blocker ring 39 between the sleeve 33 and the carrier 31 prevents such an engagement of the teeth 34 and 37 due to the action of the blocker teeth 40 acting on the internal teeth 34 until the speeds of rotation of the sun gear 20 and the carrier 31 are substantially the same, and the action of the blocker ring working on the wedge surface 38 of the carrier 31 tends to cause such synchronous rotation of the sun gear 20 and the carrier 31, in accordance with the well-known principles of operation of such blocker rings. The sleeve 33 when meshed with the teeth 37 connects the sun gear 20 and the carrier 31 together so that all of the parts of the planetary gear set 19 rotate together as a unit, causing the ring gear 21 and the output gear 11 connected therewith to rotate along with and at a one to one ratio with respect to the drive shaft 10.

The gear 11 may be caused to rotate at an overdrive speed ratio with respect to the drive shaft 10 by moving the clutch sleeve 33 into engagement with the teeth 36 formed on the member 35 fixed to the transmission case 13. The blocker ring 39 between the sleeve 33 and the member 35 functions similarly to the other blocker ring to prevent engagement until the sleeve 33 and the hub 32, on which the sleeve is splined, are synchronized in speed with the member 35 or, more specifically, until the sleeve 33 and the hub 32 are stationary, since the member 35 is stationary, and this blocker ring 39 tends to cause the sleeve 33 and hub 32 to cease rotation due to the action of the blocker ring on the tapered surface 38 formed on the member 35. When the sleeve 33 is in engagement with the teeth 36, the sleeve 33 and thereby the hub 32 and the sun gear 20 are held stationary. The planet gears 22 planetate about the centers of the shafts 10 and 12, since the carrier 31 is driven through the teeth 17 from the shaft 10, and the gears 22 drive the ring gear 21 at an overdrive or increased speed ratio with respect to the shaft 10, and the gear 11 rotates along with the ring gear 21 as it is fixed thereto. Any power take-off device may be driven directly from the shaft 12, whether the gear 11 is driven at a one to one ratio or at an overdrive ratio, the power take-off being through the gear 41, inasmuch as the gear 41 and the shaft 12 are always directly connected with the shaft 10 through the teeth 17.

The bearing needles 23 on which the gears 22 are mounted may be lubricated through the lubricating system previously described. Oil may be taken from the sump 58 and conduit 59 and discharged into the conduit 42 for this purpose. The lubricant flows from the conduit 42, through the passage 43, between the balls of the ball bearing 15, and through the passages 47, 48 and 50, the space 51, the passages 53, 54, 55, 56 and 57 to the bearing needles 23. It is obvious that this same fluid also lubricates the ball bearing 15 and the bearing 52, and some of the oil as it leaves the passage 53 also flows on to the teeth of the gears 20, 21 and 22. The sump 58 functions to collect the oil after it has performed its lubricating function and as it drains from the gearing.

I preferably pump oil from the conduit 59 to the inlet conduit 42 by means of the vacuum operated pump illustrated in Figs. 2 to 6. The pump comprises a pump housing 70 having two parts 70a and 70b between which a rubber diaphragm 71 is fixed, the two parts 70a and 70b being held together by means of machine screws 72. An opening 73 is provided through one of the housing parts 70a for purposes hereinafter to be described. A piston shaft 74 is slidably disposed in a cylindrical cavity 75 formed in the pump housing 70, and the shaft 74 has fixed on one end two annular sheet metal members 76 receiving between them the rubber diaphragm 71 for fixing the diaphragm 71 with respect to the piston shaft 74. The pump housing 70 is provided with an enlarged cylindrical cavity 77 in which a compression spring 78 is disposed. The spring 78 on one end acts on one of the diaphragm retaining members 76 and rests at its other end on the bottom of the cavity 77, as shown.

A valve 79 is provided for applying vacuum or atmospheric pressure on the side 71a of the diaphragm 71. The other side 71b of the diaphragm 71 always has atmospheric pressure thereon due to the opening 73 in the casing 70. The valve 79 is slidably disposed in a cylindrical cavity 80 provided in the pump casing 70. The cavity 80 has two ports 81 and 82 formed in the pump casing 70. The port 81 is adapted to be connected with the fuel inlet manifold 83 of the internal combustion engine of the vehicle in which the transmission is installed by means of a suitable conduit 84, and the port 82 is open simply to atmosphere. The valve 79 is provided with an axial passage 85 connected by means of radially extending passages 86 with a peripheral groove 87. A stop pin 88 is fixed in the pump casing 70 and extends through the cavity 80 and through the groove 87 for holding the valve 79 in the cavity but allowing it a predetermined reciprocating movement.

The valve 79 is moved between the limits of its movement, with the pin 88 contacting opposite ends of the peripheral groove 87, by means of over-center mechanism 89. The over-center mechanism comprises a U-shaped lever 90 swingably mounted with respect to the pump casing 70. A pair of spaced lugs 91 are provided on the casing 70, and the open end of the U-shaped lever 90 is disposed between the lugs with a pin 92 extending through the lugs and the two ends of the lever 90 to swingably mount the lever on the lugs 91. A pin 93 extends through the lever 90 adjacent its closed end and also extends into a groove 94 in the valve 79 and through a guide pin 95 pivoted with respect to the lever 90 by means of the pin 93. The guide pin 95 is provided with a cylindrical portion 96 of reduced size and has a shoulder 97 defining the inner end of the reduced portion 96. An over-center compression spring 98 is disposed on the reduced portion 96 of the pin 95 and abuts the shoulder 97. An anchor block 99 is fixed on the end of the piston shaft 74, and the block 99 is provided with a recess having an outwardly projecting protuberance 100 in the center of the recess. The upper end of the spring 98 is in the recess and fits over the protuberance 100 which holds it in the recess. A rubber cap 101 is fixed to the pump casing 70 to cover the over-center mechanism 89.

A pump piston 102 is slidably disposed in a cylindrical cavity 103 formed in the pump casing part 70a. The piston 102 is connected by means of a ball and socket connection 104 with the piston shaft 74 so that the shaft 74 and piston 102 reciprocate together.

The cavity 103 is connected with cavities 105 and 106 having valve seats 107 and 108 therein. Disc like valve elements 109 and 110 are provided in the cavities 105 and 106 adapted to fit on the seats 107 and 108 for closing the cavities. Compression springs 111 and 112 are provided in the cavities 105 and 106 and are disposed between the valve elements 109 and 110 and the opposite ends of the cavities. It will be noted that the seats 107 and 108 are on opposite ends of the cavities 105 and 106 so that one of the valve elements 110 prevents an egress of fluid out of the casing 70 while the other valve element 109 permits such an egress. The cavity 105 is connected with a port 113 which is the output port of the pump and is connected with the conduit 42 for supplying oil to the transmission. The cavity 106 is connected with a port 114 which is the inlet port of the pump and is connected with the conduit 59 of the transmission.

Figure 2:
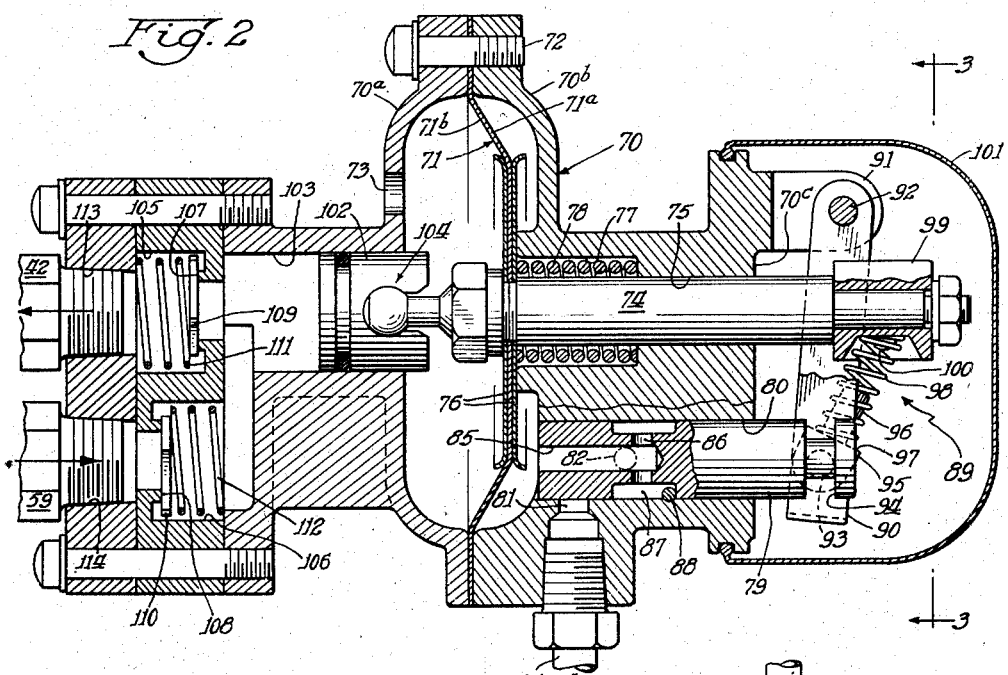
Fig. 2 is a longitudinal sectional view of a vacuum operated oil pump used for lubricating the transmission illustrated in Fig. 1.
Figure 3:
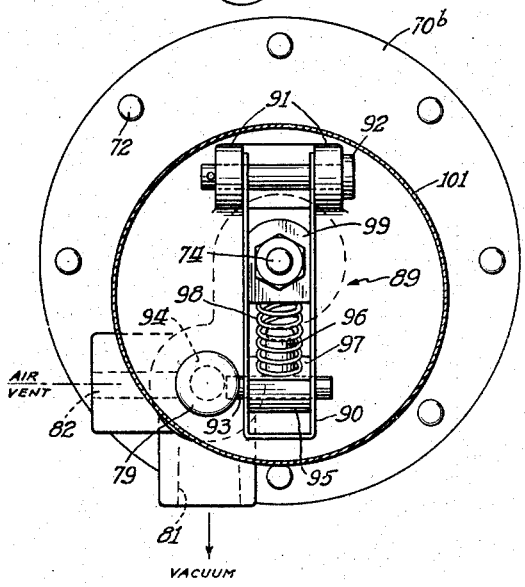
Fig. 3 is a sectional view on a reduced scale taken on line 3—3 of Fig. 2 in the direction indicated.

The vacuum from the vehicle engine manifold 83 is applied through the port 81 to the valve 79. In the position of the valve 79 in which it is illustrated in Fig. 2, the valve blocks the port 81 and vacuum is thus not impressed on the face 71a of the diaphragm 71. The face 71a of the diaphragm is rather connected with atmosphere, this connection being through the passages 85 and 86 and the groove 87 in the valve 79 and the port 82. Atmospheric pressure is also on the other face 71b of the diaphragm 71 through the opening 73, so that the pressure on both sides of the diaphragm is atmospheric and the diaphragm does not provide any force on the piston shaft 74 tending to move it in one direction or the other. The spring 78 is effective on the diaphragm through one of the plates 76 and moves the diaphragm 71, the piston shaft 74 and the piston 82 connected with the shaft 74 to the left as seen in Fig. 2. This movement of the piston 102 to the left tends to compress any oil in the cylindrical cavity 103 and move it into the cavity 105 and through the port 113 and conduit 42 to the inlet passage 43 in the transmission. This movement of the fluid from the cavity 103 to the cavity 105 causes the valve element 109 to move off its seat 107 against the action of the compression spring 111 so as to allow this movement of fluid from the cavity 103 to the cavity 105. On this movement of the piston 102 to the left as seen in Fig. 2, fluid is prevented from moving back into the inlet port 114 and inlet conduit 59 by the valve element 110 which remains seated on its seat 108.

Figure 5:
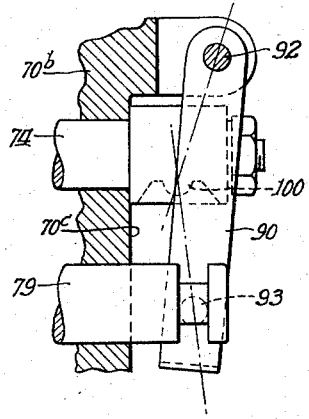
Figs. 4, 5 and 6 are partial, longitudinal, sectional views of the pump with parts of the pump being in various different positions.
Figure 6:
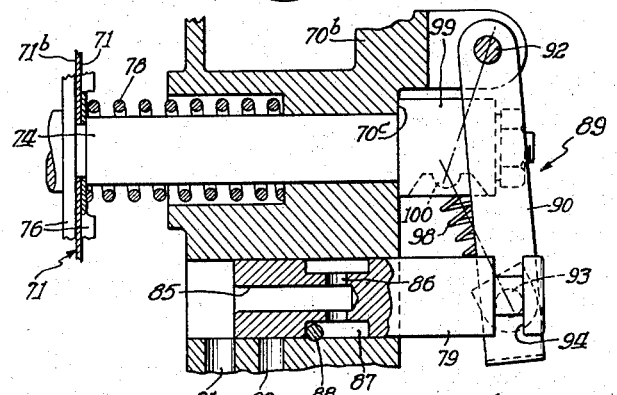
Figure 4:
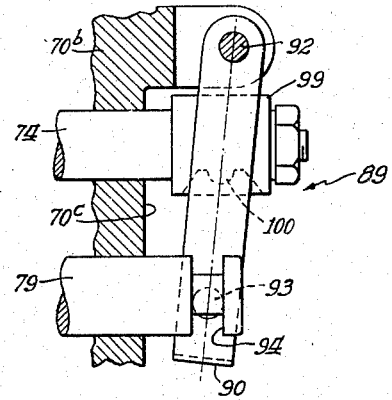

The over-center mechanism 89 is operative on this movement of the piston shaft 74 to the left as seen in the drawings to move the piston 79 to the right. During this movement of the piston shaft 74, the anchor block 99 moves to and past a position in which the protuberance 100 is diametrically between the pin 92 and the pin 93 as seen in Fig. 4, with the valve 79 still being in its Fig. 2 position blocking the application of vacuum to the diaphragm surface 71a. During this movement of the piston shaft 74 between its Fig. 2 and Fig. 4 positions, the spring 98 is compressed about the reduced portion 96 of the pivoted guide pin 95. Movement of the piston shaft 74 continues under the action of the spring 78 until the anchor block moves toward a position in contact with the face 70c of the pump casing 70, as shown in Fig. 5. The protuberance 100 under these conditions is out of line, to the left, of a line joining the pins 92 and 93, with the valve 79 still being in its Fig. 2 position. The compression spring 98 under these circumstances acts on the pin 95 and thus on the U-shaped lever 90, as is apparent from Fig. 5, to swing the lever 90 in a counterclockwise direction about the pin 92, so as to bring the lever 90 into its position in which it is illustrated in Fig. 6. The pin 93, as has been previously described, fits in a slot in the valve 79 and the valve 79 is thus moved longitudinally, along with the lever 90, to the limit of its movement to the right as seen in Fig. 6 in which the pin 88 is in contact with the left side of the peripheral groove 87 in the valve 79.

The valve 79 in its Fig. 6 position opens the port 81 to the side 71a of the diaphragm 71, and vacuum is thus applied to this side of the diaphragm and pulls the diaphragm, the diaphragm retaining members 76 and the piston shaft 74 to the right against the action of the spring 78. The shaft 74 under these conditions moves from its Fig. 6 position back to its Fig. 2 position, and the valve 102 is given a similar movement. The valve 102 on this movement sucks oil into the chamber 103 from the chamber 106, the port 114, the conduit 59 and the sump 58. The valve element 110 under these conditions of flow moves off its seat 108 against the action of the spring 112, and the valve element 109 remains seated on its seat 107 and prevents the withdrawal of any fluid from the outlet port 113 and outlet conduit 42 of the pump.

The over-center mechanism 89 on this movement of the piston shaft 74 and the anchor block 98 from their Fig. 6 positions back to their Fig. 2 positions functions to move the valve 79 from its Fig. 6 position to its Fig. 2 position. The protuberance 100 of the anchor block 99 will move across a center line joining the pin 92 and the pin 93 in the Fig. 6 position of the valve 79, and, after crossing this center line, the spring 98 between the protuberance 100 and the pivoted guide pin 95 functions to swing the lever 90 in a clockwise direction from its Fig. 6 position back to its Fig. 2 position. The valve 79, having a slotted connection with the pin 93, will move along with the lever 90 into the Fig. 2 position of the valve. This action of the over-center mechanism 89 in moving the valve 79 back from its Fig. 6 position to its Fig. 2 position is similar to its action in moving the piston from its Fig. 2 position originally into its Fig. 6 position, and this operation need not therefore be described in greater detail.

The piston shaft 74, the piston 102 and the anchor block 99 will continue to reciprocate between their Fig. 2 and Fig. 6 positions as long as vacuum is supplied from the engine manifold 83 to the valve 79. The valve 79 reciprocates in timed relationship with the piston shaft 74 and anchor block 99 due to the action of the over-center mechanism 89, the valve 79 being moved to the left to block vacuum application to the diaphragm 71 when the piston shaft 74 reaches its Fig. 2 position, and the valve 79 being moved back to its Fig. 6 position, opening the vacuum port 81 to the side 71a of the diaphragm 71, when the piston shaft 74 reaches its Fig. 6 position. The continued reciprocations of the piston 102 connected with the piston shaft 74 alternately draw in fluid from the intake conduit 59 and expel the fluid from the cavity 103 and into the conduit 42, with the valve elements 109 and 110 assuring that the flow of lubricating fluid continues through the pump from the intake port 114 to the outlet port 113. The rate of reciprocation of the piston 74 and the piston 102 and thereby the rate of discharge of the pump may be varied by varying the size of the vacuum port 81.

I have provided an improved vacuum operated oil circulating pump which may be advantageously used where oil pressure lubrication is needed. It is described herein to be used to lubricate the planetary pinions of the illustrated overdrive unit, and advantageously, therefore, the pump may be mounted separately from the transmission with only the two conduits 59 and 42 connecting the pump and transmission. It needs no mechanical driving connection from the vehicle engine, from the transmission, or from any other rotating part. The over-center mechanism 89 advantageously includes the lever 90 mounted on the pump casing 70 which takes the stress of the spring 98, so that the spring puts no lateral pressure on the valve 79 causing it to bind.

I wish it to be understood that my invention is not to be limited to the specific constructions and arrangements shown and described, except only insofar as the claim may be so limited, as it will be understood to those skilled in the art that changes may be made without departing from the principles of the invention.

I claim:

In a transmission mechanism, the combination of a housing; a drive shaft constituting a power input shaft journalled and extending through one end of said housing; a power takeoff or driven shaft journalled and extended through an opposite end of said housing; a power output element carried by said driven shaft on the outside of said housing; spline means for directly connecting together said drive shaft and said driven shaft; a driven element concentrically disposed and journalled on said drive shaft; planetary gearing located between said power output element and said driven element and driven by said drive shaft and operative to drive said driven element; said planetary gearing comprising a sun gear formed on a sleeve shaft surrounding said driven shaft, a ring gear connected with said driven element, a planet gear in mesh with said sun gear and with said ring gear, and a planet gear carrier connected to said driven shaft; and a two-position synchromesh positive-type engaging device located within said housing axially between said planetary gearing and said power output element and effective in one position to lock together said sun gear and said planet gear carrier whereby said driven element is driven at a one-to-one speed ratio with respect to said drive shaft, said engaging device being effective in its second position to hold said sun gear stationary whereby said driven element is driven at an overdrive ratio with respect to said drive shaft.

References Cited in the file of this patent

UNITED STATES PATENTS

| | | |
|---|---|---|
| 2,028,371 | Wiltse | Jan. 21, 1936 |
| 2,212,436 | Clements | Aug. 20, 1940 |
| 2,343,291 | Gilfillan et al. | Mar. 7, 1944 |
| 2,386,220 | Lawler et al. | Oct. 9, 1945 |
| 2,389,159 | Lowther | Nov. 20, 1945 |
| 2,399,657 | Banker | May 7, 1946 |
| 2,403,579 | Carpenter | July 9, 1946 |
| 2,408,336 | Orr | Sept. 24, 1946 |
| 2,409,506 | McFarland | Oct. 15, 1946 |
| 2,507,050 | Roberts | May 9, 1950 |
| 2,518,837 | Taylor | Aug. 15, 1950 |
| 2,535,703 | Smith | Dec. 26, 1950 |
| 2,630,025 | Lapsley | Mar. 3, 1953 |
| 2,733,791 | Short | Feb. 7, 1956 |
| 2,747,416 | Swenson et al. | May 29, 1956 |
| 2,800,803 | Bechman et al. | July 30, 1957 |